Patented Nov. 8, 1932

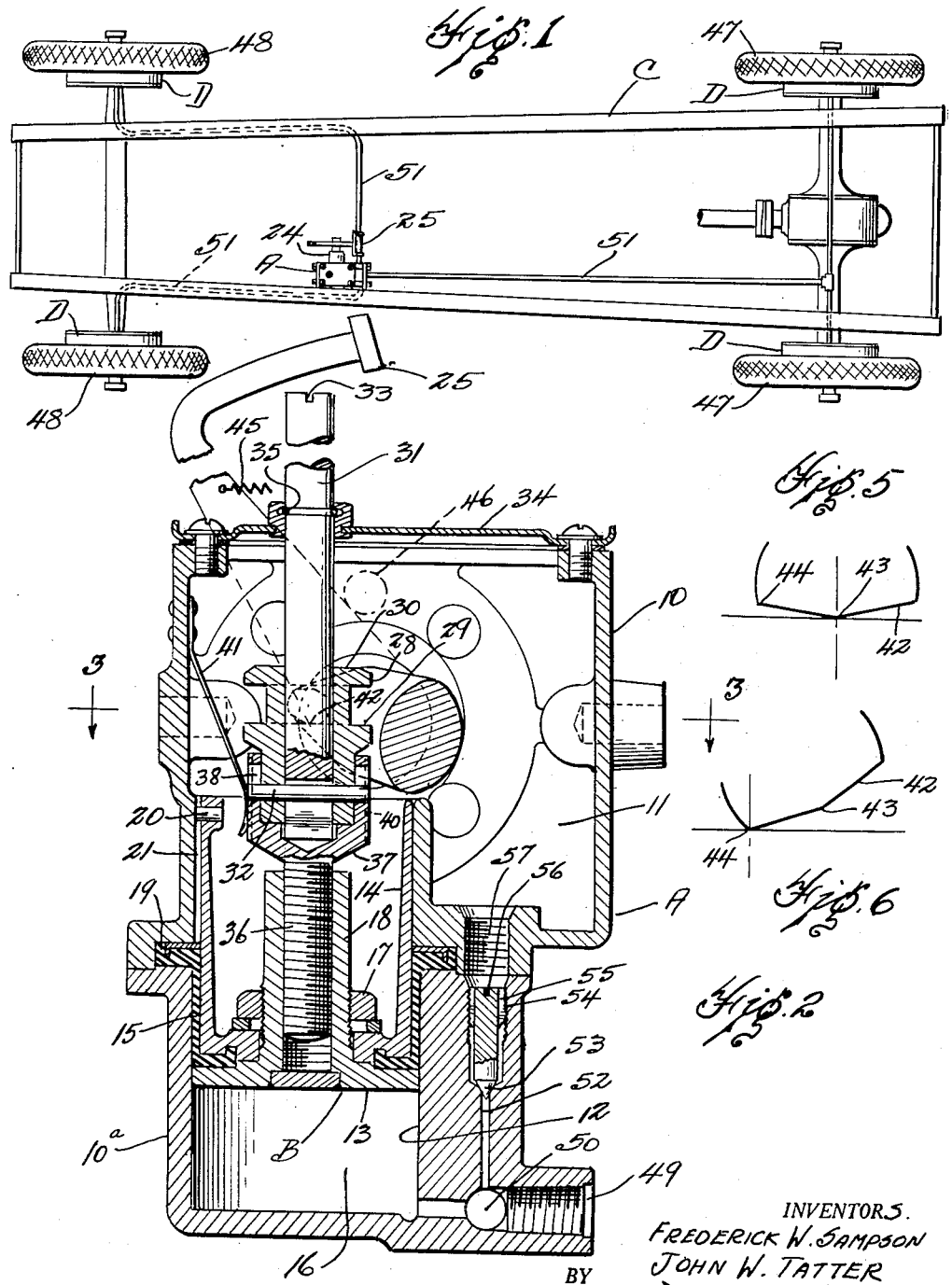

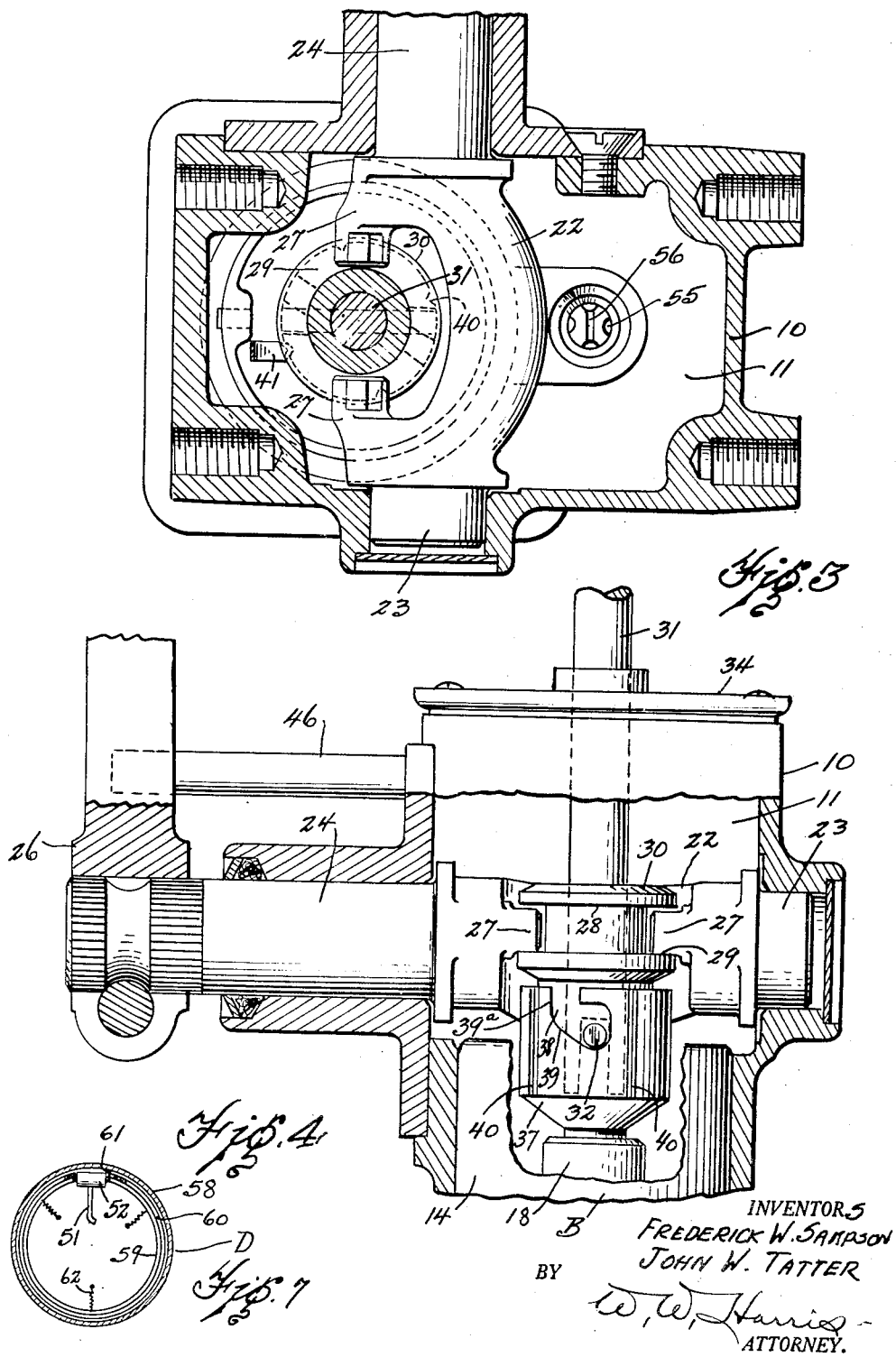

1,886,594

UNITED STATES PATENT OFFICE

FREDERICK W. SAMPSON, OF DETROIT, MICHIGAN, AND JOHN W. TATTER, OF CHICAGO, ILLINOIS; SAID SAMPSON ASSIGNOR TO CONTINENTAL MOTORS CORPORATION, OF DETROIT, MICHIGAN, A CORPORATION OF VIRGINIA, AND SAID TATTER ASSIGNOR TO LEWIS DIFFERENTIAL COMPANY, OF CHICAGO, ILLINOIS, A CORPORATION OF ILLINOIS

BRAKE

Application filed March 8, 1929. Serial No. 345,293.

This invention relates to brakes and refers more particularly to fluid brakes such as are used in connection with motor vehicles.

It is an object of our invention to provide an improved brake mechanism which we have conveniently arranged in an assembly structure referred to as the master cylinder.

A further object of our invention resides in the provision of a cylinder and piston structure which serves both as a pressure applying means for the brake system and also as a take-up for compensating for loss of fluid in the system, brake band wear, and like factors. Our invention thus provides a compact structure simplified in manufacture and use.

A further feature of this invention resides in the provision of means associated with the take-up device whereby it is impossible for the operator to take-up the brakes excessively. This feature automatically assures the proper clearance for the brake shoe and drum and provides a fool proof means for setting the brake system for efficient operation.

A still further feature of the invention resides in the provision of a brake pedal operating device which acts on the piston of the master cylinder to quicken the movement of the piston toward the end of its stroke. This accelerated movement of the piston signifies itself to the operator in an increase in the pedal pressure thus warning the operator that additional fluid should be placed in the system and also which is perhaps more important having the effect of quickly taking up any unusual clearance between the brake drums and shoes such as is occasioned by excessively heating the drums as in applying the brakes while the vehicle is going down a long hill.

Other features of our invention reside in the provision of a unitary casing housing the master cylinder and fluid reservoir, our illustrated embodiment also further incorporating means for initially filling the system with fluid or subsequently draining the system.

Other objects of our invention reside in the novel combination and arrangement of parts more particularly hereinafter described and claimed.

Referring to the drawings in which we have illustrated one preferred embodiment of our invention, Fig. 1 is a diagrammatic plan view of a motor vehicle chassis having our brake apparatus applied thereto, Fig. 2 is a sectional elevation view through the master cylinder, Fig. 3 is a sectional view through 3—3 of Fig. 2, Fig. 4 is a further sectional elevation view through the master cylinder at right angles to Fig. 2, Figs. 5 and 6 are diagrammatic views showing successive positions of the pressure finger cams, and Fig. 7 is a diagrammatic view of one of the wheel brake devices.

In the drawings reference character A represents the master cylinder structure comprising a casing 10 forming a fluid reservoir 11. The casing 10ª cooperates with the casing 10 to provide a cylinder 12 within which is located a piston structure B. Piston B has a head 13 and skirt 14 guided by the walls of cylinder 12 and between the head and skirt is fixed a cup 15 of suitable resilient material such as rubber composition whereby the cylinder working space 16 is sealed against communication with the reservoir 11 past the piston B. Thus the cylinder 12 has a diameter larger than that of the cylinder of casing 10 by an amount sufficient to accommodate the cup 15, the latter substantially filling the space between piston B and cylinder 12. The cup 15 is shown fixed by a nut 17 engaging the stem 18 of the piston head 13, the outer flange 19 of cup 15 being clamped between the casings 10 and 10ª. The piston skirt 14 carries a pin 20 engaging slot 21 in casing 10 whereby the piston may reciprocate but is prevented from rotating.

Journaled by casing 10 is a rock shaft 22 having bearing engaging portions 23, 24, a suitable pedal 25 and arm 26 being connected to rock the shaft 22 for reciprocating piston B. Shaft 22 has a yoke portion providing pressure fingers 27 which work in the annular space provided by the spaced flanges 28, 29 of the collar 30. This collar receives an adjusting rod 31 rotatably fixed with the collar by a pin 32, the lower end of rod 31 being forked to receive the pin. The upper end of rod 31 is slotted at 33 to receive a screw driver and rod 31 is rotatably supported on the casing cover 34 by reason of the groove and spring clip 35 whereby rod 31 may rotate but not reciprocate.

The stem 18 is internally threaded to receive the threaded shank 36 of the connecting member 37, the latter having openings 38 to receive the ends of pin 32. The openings 38 have a cam face 39 and vertical face 39$^a$, the purpose of which will be later apparent. The member 37 is externally knurled or grooved at 40 for engagement with spring 41 the latter exerting a drag on member 37 yieldingly resisting its rotation.

The pressure fingers 27 preferably terminate in cam engaging surfaces 42 (see Figs. 5 and 6) formed so as to increase the leverage length of the pressure fingers toward the end of the piston stroke and thereby accelerating the movement of the piston with respect to the pressure fingers. Thus each cam surface 42 has the two points 43 and 44, the point 43 engaging flange 29 for the greater part of the movement of pedal 25. Toward the end of the stroke, however, the point 44 becomes the point of contact with flange 29 thus increasing the length of the pressure finger leverage by the distance between points 43 and 44 and increasing the rate of travel of the flange 29 and piston B with respect to movement of pedal 25. A spring 45 restores the pedal 25 and piston B to brake releasing position, a suitable stop 46 limiting the return movement.

The master cylinder A also preferably has provision for removing air from the brake system and filling with the brake fluid which is preferably a liquid, or for removing the liquid from the system. Thus assuming the master cylinder to be used in connection with a vehicle braking system as diagrammatically illustrated in Fig. 1 in which chassis C has rear wheels 47 and front wheels 48, with fluid brake devices of suitable construction associated in the well known manner with the wheels as at D. Thus in Fig. 7 we have illustrated one of the brake devices D in conventional manner as comprising drum 58 fixed to its wheel, this drum being engaged by shoe 59 carrying friction lining 60, the hose 51 conducting fluid under pressure for acting on cylinder 52 to spread the brake shoe 59 into engagement with drum 58. Clearance 61 is maintained by springs 62 supplemented by any inherent resilience of shoe 59 whereby on release of the pressure in hose 51 the shoe will clear the drum as customary. From cylinder chamber 16 the fluid under pressure is passed through outlet 49, 50 and connecting hose or tubes 51 to the various brake devices D. A passage 52 communicates at a suitable point with the fluid system, this passage having an associated valve 53 threadedly engaging the enlarged opening 54. This valve has a plurality of longitudinal ports or passages 55 (see Figs. 2 and 3) whereby when the valve is unseated fluid may pass longitudinally of the valve. The end of valve 53 is slotted at 56 for engagement with a screw driver to open or close the valve. The enlarged passage 54 opens upwardly into an additional passage 57 which opens into chamber 11, the passage 57 being internally threaded to accommodate a suitable suction apparatus or suction pump (not shown) which may be of any suitable type.

The operation of our improved apparatus is as follows, assuming the master cylinder to be associated with a vehicle brake system as illustrated. To fill the system the cover 34 is removed and valve 53 is unseated and a suction device connected to the threaded passage 57. The suction will remove substantially all of the air throughout the entire system including chamber 16, pipes 51, and brake devices D. When substantially all of the air has been removed the fluid reservoir 11 is filled with the brake liquid and then the suction device is disconnected from passage 57 whereupon the liquid will automatically fill the entire system. Our system does not require a perfect vacuum prior to filling with the brake liquid as the presence of a small quantity of air in the system is not objectionable in actual practice. The valve 53 is then seated and the cover 34 replaced, the master cylinder being then ready for operation.

In applying the brake devices D the operator presses pedal 25 to rock shaft 22 and move pressure fingers 27 downwardly against flange 29. During this operation collar 30, pin 32, member 37 and piston B move downwardly as a unit exerting a pressure on the fluid in chamber 16 and throughout the system. Should excessive lost motion develop in the system such as might be occasioned by brake lining wear, loss of fluid, or like factors then it is desirable to take up this lost motion. This is accomplished by turning rod 31 clockwise in Fig. 3. During the initial movement of rod 31 rotaton of the connecting member 37 will be prevented due to the drag exerted thereon by spring 41. However pin 32 will be rotated with rod 31, the ends of the pin engaging cam face 39 whereby the connecting member 37 and piston B will be moved downwardly until pin 31 reaches the face 39$^a$ (see Fig. 4) at which time and upon further rotation of rod 31 the connecting member 37 will rotate with rod 31. Since piston B is fixed against rotation by pin 20, piston B will be moved downwardly by the engagement of the threaded shank 36. When resistance to rotation of rod 31 is encountered then the operator is advised that all lost motion is taken up from the system and in the present embodiment the usual brake shoes 59 will be in engagement with the drums 58 of the brake devices D. The operator then releases the rod 31 whereupon the pressure in the fluid in some instances supplemented by the springs 62 and any inherent spring of the usual brake shoes will tend to move piston B upwardly. It is of course desirable to provide clearance 61 between the brake shoes 59 and drums 58 and the amount of this clearance is always automatically provided in our device, this clearance corresponding to the downward travel of piston B while pin 32 travels along groove face 39. The piston B is thus moved this predetermined amount before effecting any relative adjustment between piston B on one hand and connecting member 37 and pedal 25 on the other hand. Thus the operator cannot, in taking up slack or in adjusting the brakes at the master cylinder, set the fluid pressure so high that on release of rod 31 the brake shoes 59 will not have their desired clearance. This is particularly important when the adjustment is made by one inexperienced with the general brake system which includes the average driver of an automobile. Thus when rod 31 is released after making adjustment, piston B will be forced upwardly, rod 31 and collar 30 being rotated reversely by groove face 39 to restore the parts to the position of Fig. 4. If the parts should not fully restore as aforesaid then on operation of brake pedal 25 the parts will be forced into the restored position. We have therefore provided a take up device which has a predetermined initial movement corresponding generally to displacement of sufficient fluid to take up brake shoe clearance, followed by a secondary movement effective to take up lost motion in the system, the initial movement being automatically restored on completion of the take up adjustment.

What we claim as our invention is:

1. In a fluid brake system, a master cylinder structure, a piston, a brake device, fluid pressure transmitting means intermediate the master cylinder structure and brake device, said master cylinder structure having a fluid reservoir, a conduit intermediate the reservoir and pressure transmitting means, a valve in said conduit and within the master cylinder structure, and means associated with said conduit and adapted for connection with a suction producing device whereby the system may be drained of fluids.

2. A master cylinder for fluid brake systems comprising an upper casing formed with a cylinder and fluid reservoir, a lower casing having a cylinder coaxial with the upper cylinder and of greater diameter, a piston operable within said cylinders and having an upwardly extending skirt contacting with the walls of the upper cylinder, said piston having a head contacting with the walls of the lower cylinder, a yielding sealing element clamped between the piston and its head and also between the upper and lower casings, said yielding element filling the gap between the piston and lower cylinder, a valve controlled conduit between the reservoir and lower cylinder, and means for moving said piston.

3. A master cylinder for brake systems comprising a casing structure formed with a portion having a cylinder, a piston fitted within said cylinder and extending beyond said cylinder, said casing structure formed with a second portion, means securing said casing portions together, said second casing portion provided with a second cylinder coaxial with the first said cylinder and having a greater diameter than said first cylinder, said piston extending into said second cylinder and spaced therewithin, and a flexible sealing element intermediate said second cylinder and said piston and filling the space therebetween.

4. A master cylinder for brake systems comprising a casing structure formed with a reservoir portion and a cylinder, a piston fitted within said cylinder and extending beyond said cylinder, said casing structure formed with a second portion, means securing said casing portions together, said second casing portion provided with a second cylinder coaxial with the first said cylinder and having a greater diameter than said first cylinder, said piston extending into said second cylinder and spaced therewithin, and a sealing element adapted to stretch on piston movement intermediate said second cylinder and said piston, said sealing element substantially filling the space intermediate the piston and said second cylinder.

5. A master cylinder for brake systems comprising a casing structure formed with a portion having a cylinder, a piston fitted within said cylinder and extending beyond said cylinder, said casing structure formed with a second portion, means securing said casing portions together, said second casing portion provided with a second cylinder coaxial with the first said cylinder and having a greater diameter than said first cylinder, said piston extending into said second cylinder and spaced therewithin, and a sealing element intermediate said second cylinder and said piston adapted to stretch on piston movement, said sealing element substantially filling the space intermediate the piston and said second cylinder, one end of said sealing element being clamped between said casing portions.

6. A master cylinder for brake systems comprising a casing structure formed with a portion having a cylinder, a piston fitted within said cylinder and extending beyond said cylinder, said casing structure formed with a second portion, means securing said casing portions together, said second casing portion provided with a second cylinder coaxial with the first said cylinder and having a greater diameter than said first cylinder, said piston extending into said second cylinder and spaced therewithin, a flexible sealing element intermediate said second cylinder and said piston adapted to stretch on piston movement, said sealing element substantially filling the space intermediate the piston and said second cylinder, one end of said sealing element being clamped between said casing portions, and a piston head member secured to the piston and having engagement with the walls of said second cylinder.

7. A master cylinder for brake systems comprising a casing structure formed with a portion having a cylinder, a piston fitted within said cylinder and extending beyond said cylinder, said casing structure formed with a second portion, means securing said casing portions together, said second casing portion provided with a second cylinder coaxial with the first said cylinder and having a greater diameter than said first cylinder, said piston extending into said second cylinder and spaced therewithin, a flexible sealing element intermediate said second cylinder and said piston adapted to stretch on piston movement, said sealing element substantially filling the space intermediate the piston and said second cylinder, one end of said sealing element being clamped between said casing portions, and a piston head member fitted for engagement with the walls of said second cylinder, the other end of said sealing element being clamped between the piston and said piston head member.

8. A master cylinder for brake systems comprising a casing structure formed with a portion having a cylinder, a piston fitted within said cylinder and extending beyond said cylinder, said casing structure formed with a second portion, means securing said casing portions together, said second casing portion provided with a second cylinder coaxial with the first said cylinder and having a greater diameter than said first cylinder, said piston extending into said second cylinder and spaced therewithin, a flexible sealing element intermediate said second cylinder and said piston adapted to stretch on piston movement, and a piston head member fitted to the piston and having engagement with the walls of said second cylinder.

9. A master cylinder for brake systems comprising cooperating casing structures respectively provided with coaxial cylinders one of greater diameter than the other, a piston structure slidably engaging the walls of one of said cylinders and extending into the other and a sealing element filling the space between the piston and the cylinder of greater diameter and adapted to stretch on piston movement.

10. A master cylinder for brake systems comprising cooperating casing structures respectively provided with coaxial cylinders one of greater diameter than the other, a piston structure slidably engaging the walls of one of said cylinders and extending into the other, and a flexible sealing element intermediate the piston and said cylinder of greater diameter and adapted to stretch on piston movement.

In witness whereof, we hereunto subscribe our names this 1st day of March, 1929.

FREDERICK WM. SAMPSON.
JOHN W. TATTER.